United States Patent [19]

Toyozaki et al.

[11] Patent Number: 5,751,567
[45] Date of Patent: May 12, 1998

[54] AC-DC CONVERTER

[75] Inventors: Jiro Toyozaki; Takao Yanase; Shinichi Ishii; Takashi Aihara, all of Kanagawa, Japan

[73] Assignee: Fuji Electric Co., LTD., Kanagawa, Japan

[21] Appl. No.: 782,485

[22] Filed: Jan. 10, 1997

[30] Foreign Application Priority Data

Jan. 12, 1996 [JP] Japan .................................. 8-020588

[51] Int. Cl.⁶ .................................................. H02M 5/42
[52] U.S. Cl. .................................................. 363/89; 363/84
[58] Field of Search ..................... 363/39, 44, 45, 363/46, 81, 84, 89, 125, 127

[56] References Cited

U.S. PATENT DOCUMENTS

| | | | |
|---|---|---|---|
| 4,825,351 | 4/1989 | Uesugi | 363/89 |
| 5,045,991 | 9/1991 | Dhyanchand et al. | 363/89 |
| 5,598,326 | 1/1997 | Liu et al. | 363/34 |
| 5,615,098 | 3/1997 | Ishii et al. | 363/84 |

FOREIGN PATENT DOCUMENTS 7-79548  8/1995  Japan .

*Primary Examiner*—Matthew V. Nguyen
*Attorney, Agent, or Firm*—Finnegan, Henderson, Farabow, Garrett & Dunner, L.L.P.

[57] ABSTRACT

An AC-DC converter includes an adjusting unit 13 which operates to zero the difference between a DC output voltage instruction value and a DC output voltage detection value; and a modulator 16 which compares a carrier wave based on an output signal of the adjusting unit 13 with a modulating wave to output drive pulses, a switching element 3 is turned on and off with the drive pulses to provide a DC output voltage which is higher than a full-wave rectification voltage of an AC input voltage. In order to obtain the carrier wave, the AC-DC comprises further includes an AC input voltage polarity detector 7, a PLL circuit 11, and a multiplier 14 for multiplying the sine wave by an output signal of the adjusting unit 13.

6 Claims, 9 Drawing Sheets

5,751,567

AC-DC CONVERTER

BACKGROUND OF THE INVENTION

1. Field of the Invention

This invention relates to an AC-DC converter which provides a DC output voltage higher than a voltage which is obtained by subjecting an AC input voltage to full-wave rectification.

2. Description of the Related Art

An AC-DC converter of this type is known in the art and is designed as shown in FIG. 10. That is, with the AC-DC converter, there is provided a DC output voltage higher than a voltage which is obtained by subjecting an AC input voltage to full-wave rectification while the higher harmonic of an AC input current is reduced and the power factor thereof is improved (cf. Japanese Patent Examined Publication No. Hei 7-79548).

The arrangement and the operation of the conventional AC-DC converter will be described in brief.

In FIG. 10, reference numerals 3 and 4 designate a switching element and a rectifying diode which form a full-wave rectifier circuit. An AC reactor 2 and an AC current detector 30 are connected between an AC power source (or a system power source) 1 and the full-wave rectifier circuit 3 and 4.

A capacitor 5 and a load 6 are connected in parallel to the DC output side of the full-wave rectifier circuit 3 and 4.

The output terminals of the AC power source 1 are connected to an AC voltage detector 26, and the capacitor 5 is shunted by a DC voltage detector 8. Those detectors 26 and 8, and the aforementioned AC current detector 30 are connected to a control circuit which will be described below.

The output signal of the control circuit is applied, as a drive pulse, to the base and the emitter of the switching element 3.

An example of the control circuit, as shown in FIG. 10, includes a DC voltage instruction setting unit 9; an adder 10 which calculates a difference between a DC voltage instruction value provided by the setting unit 9 and a DC voltage detection value provided by the DC voltage detector 8; an adjusting unit 13 which operates to adjust the difference between those values to zero; a multiplier 14 which obtains the product of the output signal of the adjusting unit 13 and an AC voltage detection value provided by the AC voltage detector 26; an adder 31 which calculates the difference between the output signal of the multiplier 14 and an AC current detection value provided by the AC current detector 30; an adjusting unit 30 which operates to adjust the difference calculated by the adder to zero; an adder 33 which obtains the sum of the output signal of the adjusting unit 30 and an AC voltage detection value provided by the AC voltage detector 26; a chopping wave generator 15 serving as a modulating wave generator; and a modulator 16 which compares a chopping wave outputted by the chopping wave generator 15 with the output signal of the aforementioned adder 33 (which is modulated, thus being referred to as "a carrier wave") to form drive pulses for the switching element 3.

When, in the AC-DC converter thus organized, the switching element 3 is turned on and off with a frequency higher than the AC input frequency so that the AC input voltage waveform and the AC input current waveform are coincident with each other, then an AC input current flows which is equal in phase and in waveform to an AC input voltage, and on the DC output side, the voltage across the capacitor 5 is increased.

When the terminal voltage of the capacitor 5 reaches an instruction value set by the aforementioned DC voltage instruction setting unit 9, the adjusting unit 13 and the circuit elements following the former 13 operate to adjust the on-off operation ratio of the switching element to maintain the DC output voltage constant.

In the control circuit shown in FIG. 10, the multiplier 14 subjects the output signal of the adjusting unit 13 and an AC input voltage detection value to multiplication to obtain an AC input current instruction value, and the adjusting unit 32 is operated so as to adjust to zero the difference between the AC input current instruction value and an AC input current detection value, and the carrier wave is applied to the modulator 16 which is obtained by adding the AC input voltage detection value to the output signal of the adjusting unit 32 in a feed-forward mode, and the carrier wave is compared with the chopping wave to form the drive pulses for the switching element.

As was described above, in the circuit of FIG. 10, in order that the higher harmonic of the AC input current is reduced and the power factor thereof is improved, the AC input current is detected with the AC current detector 30, and the control circuit is provided which operates so that the waveform of the AC input current coincides with that of the AC input voltage.

However, the above-described prior art suffers from the following difficulties: That is, it needs the AC current detector 30 which is relatively expensive. In addition, as is apparent from the above description, the control circuit is intricate in arrangement with the result that the AC-DC converter is high in manufacturing cost and bulky.

SUMMARY OF THE INVENTION

In view of the foregoing, an object of this invention is to provide an AC-DC converter which has a control circuit which requires no AC input current detection, thus being simple in circuit arrangement and low in manufacturing cost.

In order to solve the above problems, according to a first aspect of the invention, there is provided an AC-DC converter, comprising:

DC output voltage instruction setting means for setting a DC output voltage instruction value;

DC output voltage detecting means for detecting a DC output voltage detection value;

adjusting means for adjusting which operates to zero a difference between the DC output voltage instruction value and the DC output voltage detection value to zero;

means for generating a modulating wave;

a modulator for comparing a carrier wave based on an output signal from said adjusting means with the modulating wave to output drive pulses;

a switching element which turns on and off according to the drive pulses to provide a DC output voltage higher than a full-wave rectification voltage of an AC input voltage;

an AC power source for generating an AC input voltage;

means for detecting the polarity of the AC input voltage;

means for generating a sine wave synchronous with the AC input voltage according to a detection value from said polarity detecting means; and a multiplier for multiplying the sine wave by an output signal of said adjusting means to obtain the carrier wave.

According a second aspect of the invention, there is provided an AC-DC converter, comprising:

DC output voltage instruction setting means for setting a DC output voltage instruction value;

DC output voltage detecting means for detecting a DC output voltage detection value;

adjusting means for adjusting which operates to zero a difference between the DC output voltage instruction value and the DC output voltage detection value to zero;

means for generating a modulating wave;

a modulator for comparing a carrier wave based on an output signal from said adjusting means with the modulating wave to output drive pulses;

a switching element which turns on and off according to the drive pulses to provide a DC output voltage higher than a full-wave rectification voltage of an AC input voltage;

an AC power source for generating an AC input voltage;

means for detecting an AC input voltage to output an AC input voltage detection value; and a multiplier for multiplying the AC input voltage detection value by an output signal from the adjusting means to obtain the carrier wave.

According to a third aspect of the invention, there is provided an AC-DC converter, comprising:

DC output voltage instruction setting means for setting a DC output voltage instruction value;

DC output voltage detecting means for detecting a DC output voltage detection value;

adjusting means for adjusting which operates to zero a difference between the DC output voltage instruction value and the DC output voltage detection value to zero;

means for generating a modulating wave;

a modulator for comparing a carrier wave based on an output signal from said adjusting means with the modulating wave to output drive pulses;

a switching element which turns on and off according to the drive pulses to provide a DC output voltage higher than a full-wave rectification voltage of an AC input voltage;

an AC power source for generating an AC input voltage;

means for detecting the polarity of an AC input voltage to output an AC input voltage polarity detection value;

means for generating a waveform which is synchronous with the AC input voltage and is zero in one-period integration value according to the AC input voltage polarity detection value; and a multiplier for multiplying the waveform by an output signal from the adjusting means to obtain the carrier wave.

In the AC-DC converter according to the third aspect of the invention, the waveform may be changed in configuration and/or phase according to a load factor.

According to a fourth aspect of the invention, there is provided an AC-DC converter, comprising:

DC output voltage instruction setting means for setting a DC output voltage instruction value;

DC output voltage detecting means for detecting a DC output voltage detection value;

adjusting means for adjusting which operates to zero a difference between the DC output voltage instruction value and the DC output voltage detection value to zero;

means for generating a modulating wave;

a modulator for comparing a carrier wave based on an output signal from said adjusting means with the modulating wave to output drive pulses;

a switching element which turns on and off according to the drive pulses to provide a DC output voltage higher than a full-wave rectification voltage of an AC input voltage;

an AC power source for generating an AC input voltage;

means for detecting an AC input voltage to output an AC input voltage detection value;

a function generator for outputting a waveform which is synchronous with the AC input voltage and has a frequency which is an integer multiple of the frequency of the AC input voltage and which is zero in one-period integration value; and an adder for adding an output waveform from said function generator to the AC input voltage detection value to obtain the carrier wave.

In the AC-DC converter according to the fourth aspect of the invention, an output waveform of said function generator may be changed in configuration or phase according to a load factor.

BRIEF DESCRIPTION OF THE DRAWINGS

The above and other objects and features of the present invention will be more apparent from the following description taken in conjunction with the accompanying drawings.

DETAILED DESCRIPTION OF THE PREFERRED EMBODIMENTS

Preferred embodiments of the invention will be described with reference to the accompanying drawings.

Figure 1:
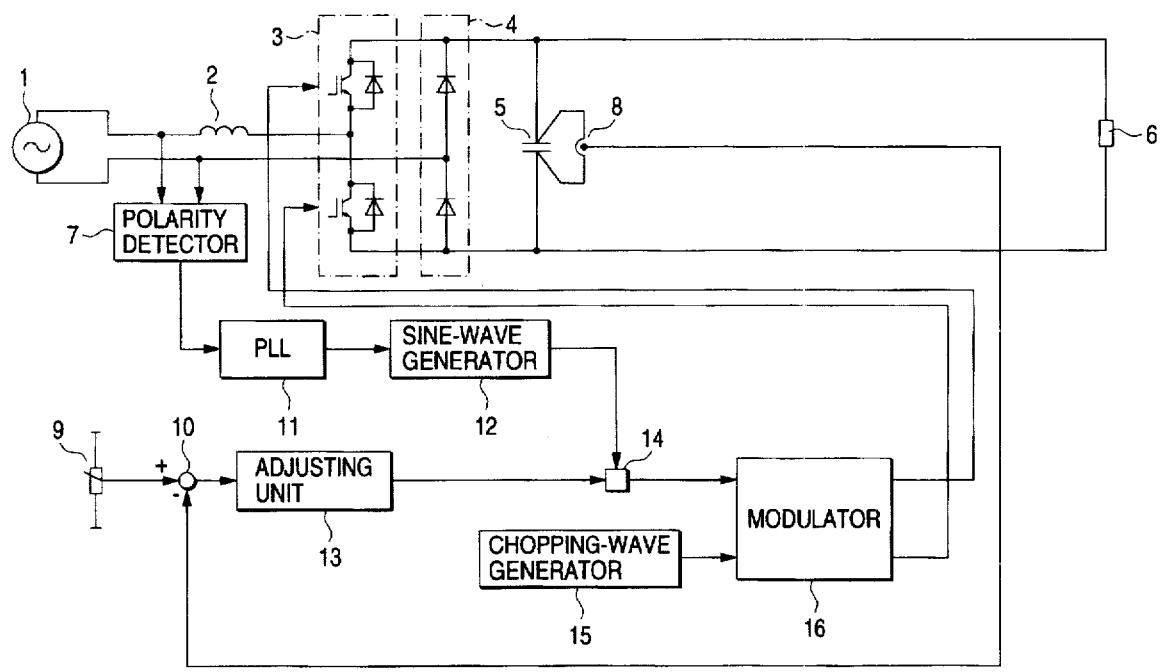
FIG. 1 is a circuit diagram showing a AC-DC converter according to a first embodiment of the invention.

FIG. 1 shows an AC-DC converter according to a first embodiment of the invention.

Figure 10:
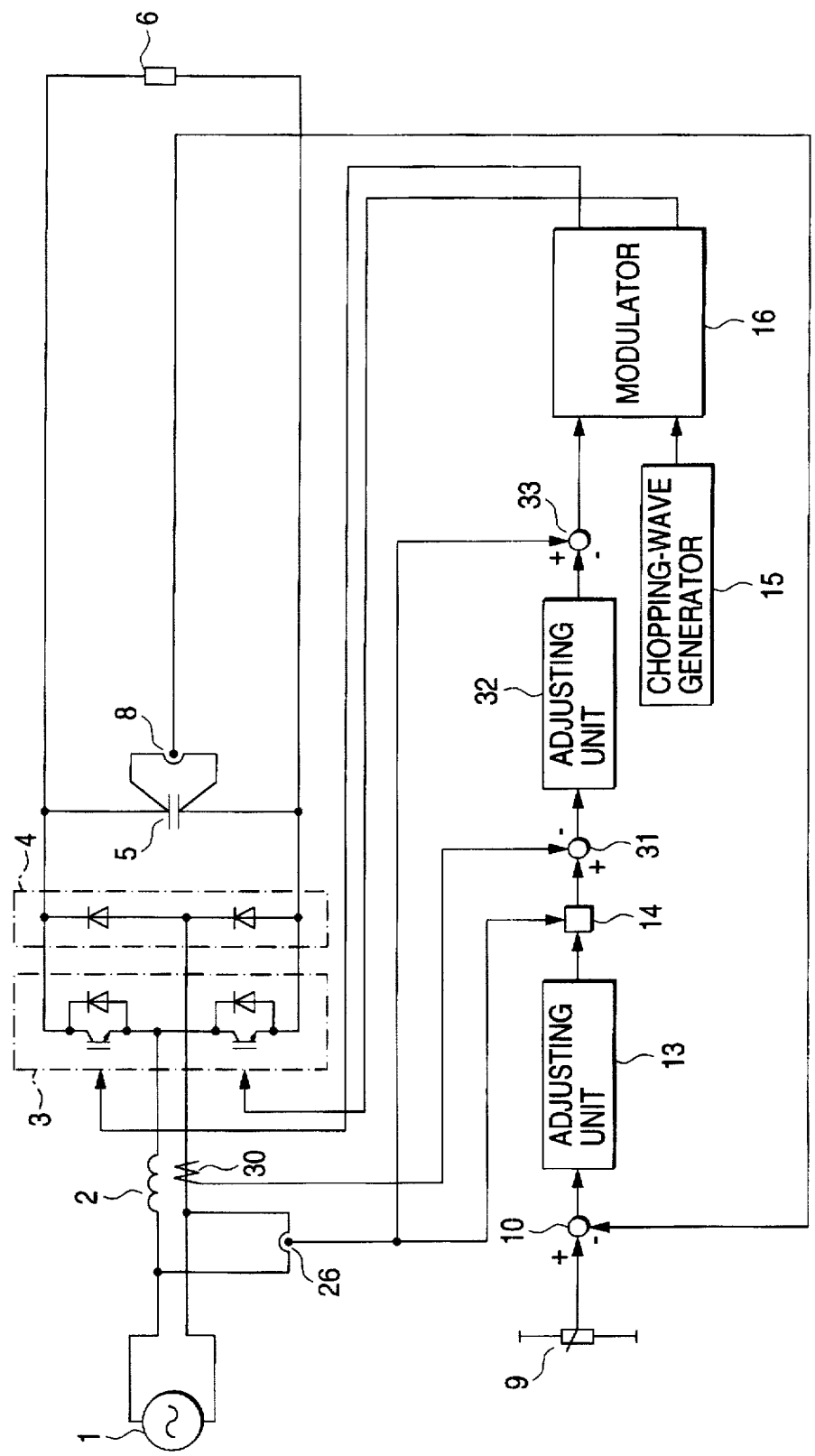
FIG. 10 is a circuit diagram showing a conventional AC-DC converter.

The arrangement of the main circuit of the AC-DC converter is equal to that of the main circuit of the conventional AC-DC converter shown in FIG. 10. Hence, in FIG. 1, circuit elements of the main circuit corresponding functionally to those already described with reference to FIG. 10 are therefore designated by the same reference numerals or characters.

In the first embodiment, the AC voltage detector 26 and the AC current detector 30, which are shown in FIG. 10 (the prior art) are not employed.

That is, in FIG. 1, both output terminals of the AC power source 1 are connected to a polarity detector 7, which outputs a polarity detection value. The polarity detection value thus outputted is applied to a PLL circuit, the output signal of which is applied to a sine-wave generator 12.

On the other hand, similarly as in the case of FIG. 10, the DC voltage instruction value provided by the DC voltage instruction setting unit 9, and the DC voltage detection value provided by the DC voltage detector 8 are applied to the adder 10, and the difference between those values is applied to the adjusting unit 13.

The output signal of the adjusting unit 13 is applied to the multiplier 14, so that the product of the output signal of the adjusting unit 13 and the output signal (sine-wave) of the sine-wave generator 12 is applied, as a carrier wave, to the modulator 16. In FIG. 1, reference numeral 15 designates a chopping wave generator which is equal to the one in FIG. 10.

The circuit shown in FIG. 1 operates as follows:

The DC voltage difference, which is outputted by the adder 10, is applied to the adjusting unit 3, so that the amount of increase in DC voltage is calculated.

When the polarity detection value of the AC input voltage is applied to the PLL circuit 11 by the polarity detector 7, the PLL circuit 11 outputs a signal synchronous with the AC input voltage, and the sine-wave generator 12 outputs a sine-wave which is in phase with the AC input voltage.

In the multiplier 14, the sine-wave is multiplied by the output signal of the adjusting unit 13, so that a sine-wave which is in phase with and in proportion to the AC input voltage is applied, as a carrier wave, to the modulator 16.

The modulator 16 is, for instance, a PWM modulator. The modulator 16 compares with the carrier wave with the modulating wave; i.e., the chopping wave, to form a drive pulse signal which is applied to the switching element 3. The drive pulse signal has much higher in frequency than the AC input, so that the on-off operation of the switching element controls the terminal voltage of the capacitor 5 so that it is in conformance with the DC voltage instruction value.

In the AC-DC converter thus designed, while the DC output voltage is maintained at a predetermined value, the voltage instruction value is formed according to the sine-wave which is in phase with and in proportion to the AC input voltage. Hence, the phase of the AC input current can be made substantially equal to that of the AC input voltage.

Hence, in the AC-DC converter, unlike the conventional one shown in FIG. 10, without the use of the AC current detector and the AC voltage detector the power factor can be improved while the DC output voltage is maintained constant. In addition, by making the AC input current waveform more sinusoidal, the higher harmonics can be reduced.

In the prior art, the AC current detector is relatively expensive and bulky, and the installation thereof takes time and labor. On the other hand, the first embodiment (FIG. 1) is advantageous in that electronic technique is employed to miniaturize the polarity detector 7, the PLL circuit 11, and the sine-wave generator, and to form them at low manufacturing cost.

Figure 2:
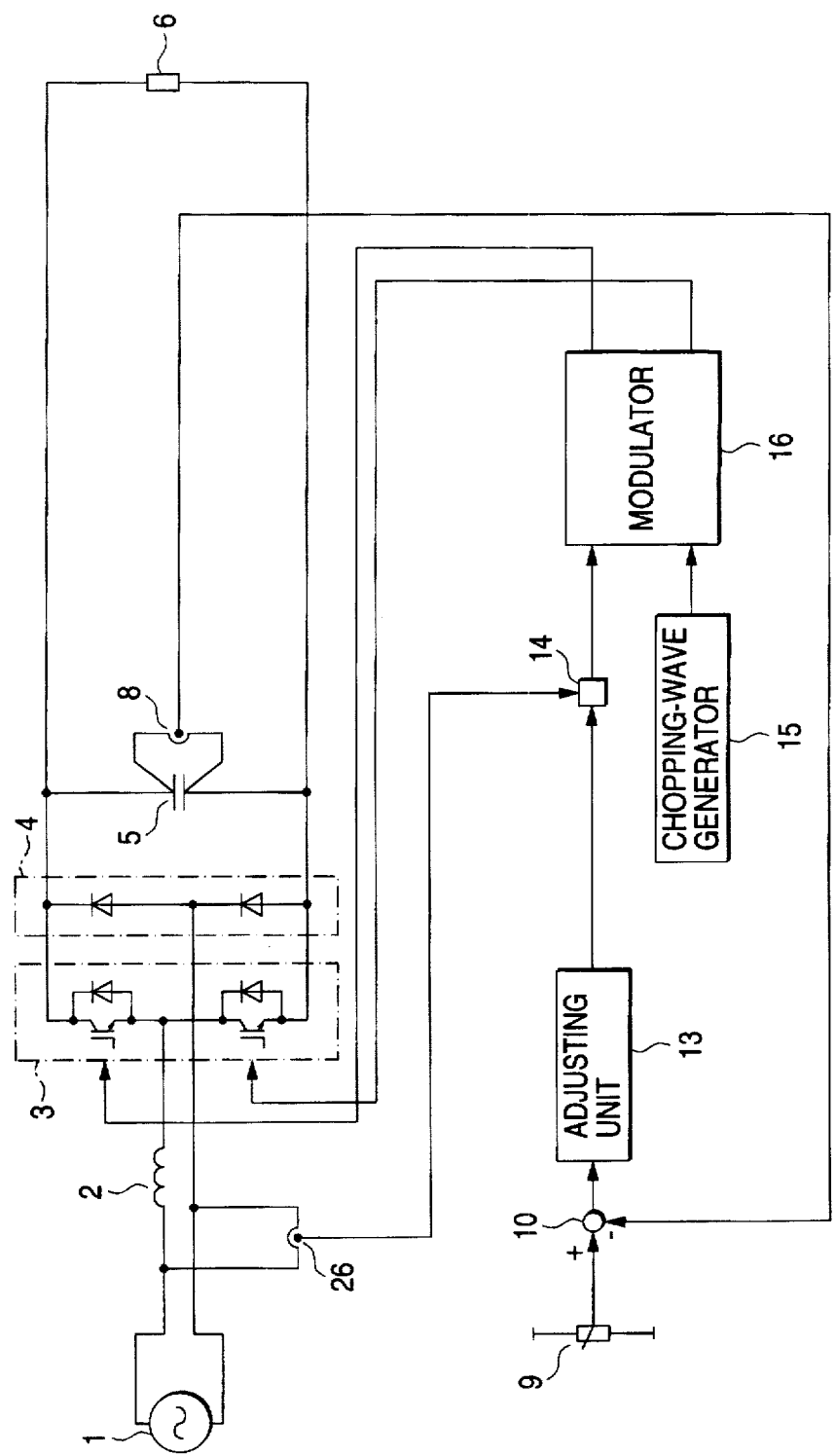
FIG. 2 is a circuit diagram, partly as a block diagram, showing an AC-DC converter according to a second embodiment of the invention.

FIG. 2 shows an AC-DC converter according to a second embodiment of the invention.

In the second embodiment, the AC input voltage is detected with the AC voltage detector 26. In the multiplier 14, the detection value of the latter 26 is multiplied by the output signal of the adjusting unit 13, to obtain a sine-wave which is synchronous with and proportional to the AC input voltage. The sine-wave is applied, as a carrier wave, to the modulator 16.

In the second embodiment, similarly as in the case of the first embodiment, by making the AC input current waveform more sinusoidal, the higher harmonics are reduced, and the power factor is improved.

In addition, the second embodiment is advantageous in that the control circuit is simpler in arrangement than the one in the first embodiment.

Figure 3:
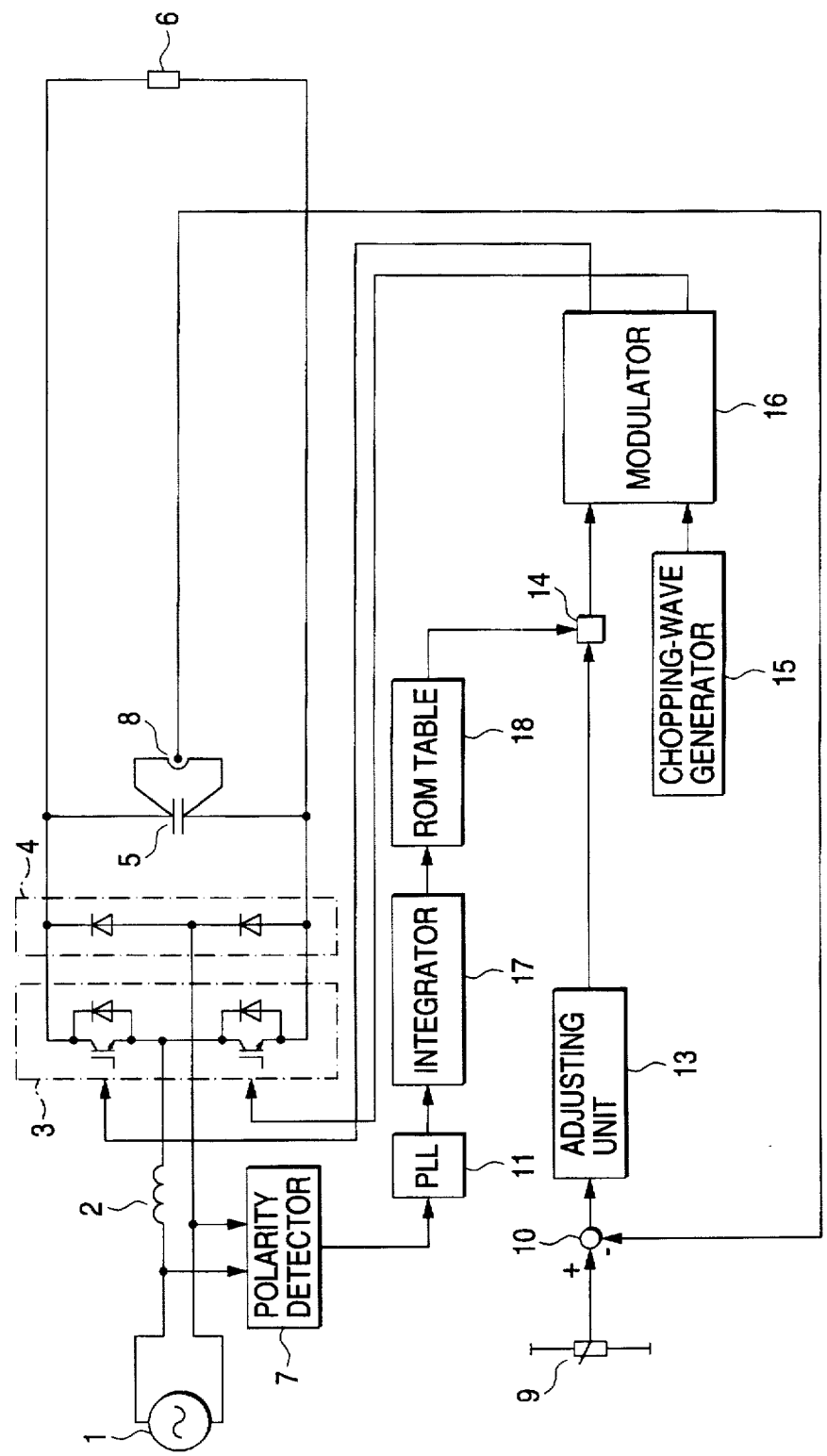
FIG. 3 is a circuit diagram showing an AC-DC converter according to a third embodiment of the invention.

FIG. 3 shows an AC-DC converter according to a third embodiment.

The third embodiment is obtained by replacing the sine-wave generator 12 in the first embodiment with a series circuit of an integrator 17 and a ROM table 18. In the ROM table 18, a wave such as a trapezoidal wave and a chopping wave is stored the one-period integration value of which is zero. In the multiplier 14, the output wave of the ROM table 18 is multiplied by the output signal of the adjusting unit 13, to obtain a carrier wave.

Figure 4:
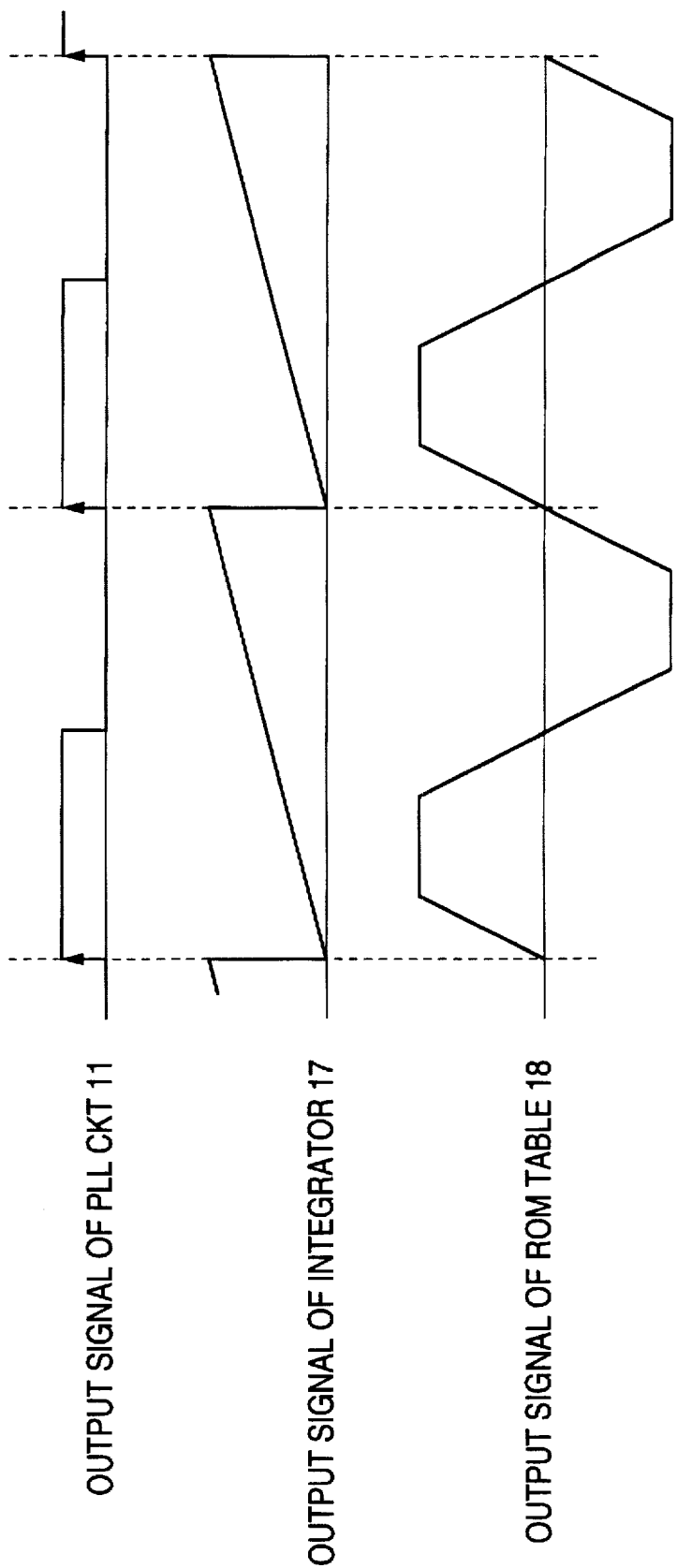
FIG. 4 is a waveform diagram for a description of the operations of essential parts of the AC-DC converter shown in FIG. 3.

FIG. 4 is a waveform diagram for a description of the operation of the PLL circuit 11, the integrator 17, and the ROM table 18. In FIG. 4, the output signal of the PLL circuit 11 is in synchronization with the AC input voltage, and therefore one period of the AC input voltage can be detected from the output signal of the PLL circuit 11.

The integrator 17 is to integrate a predetermined value which is an external input value. The integrator 17 is reset by the rise of the output signal of the PLL circuit 11.

In the case where the external input value integrated by the integrator 17 attributes to the power source frequency, the output signal of the integrator 17 is data on phase (position). Hence, the output signal of the integrator 17 may be used to change the phase of the carrier wave.

In the third embodiment, the wave stored in the ROM table is the one which is obtained by superposing distortions effective in reducing the higher harmonics. Hence, by using a carrier wave based on the wave, it is possible to make the AC input current wave more sinusoidal, which reduces the higher harmonics and improves the power factor.

Figure 5:
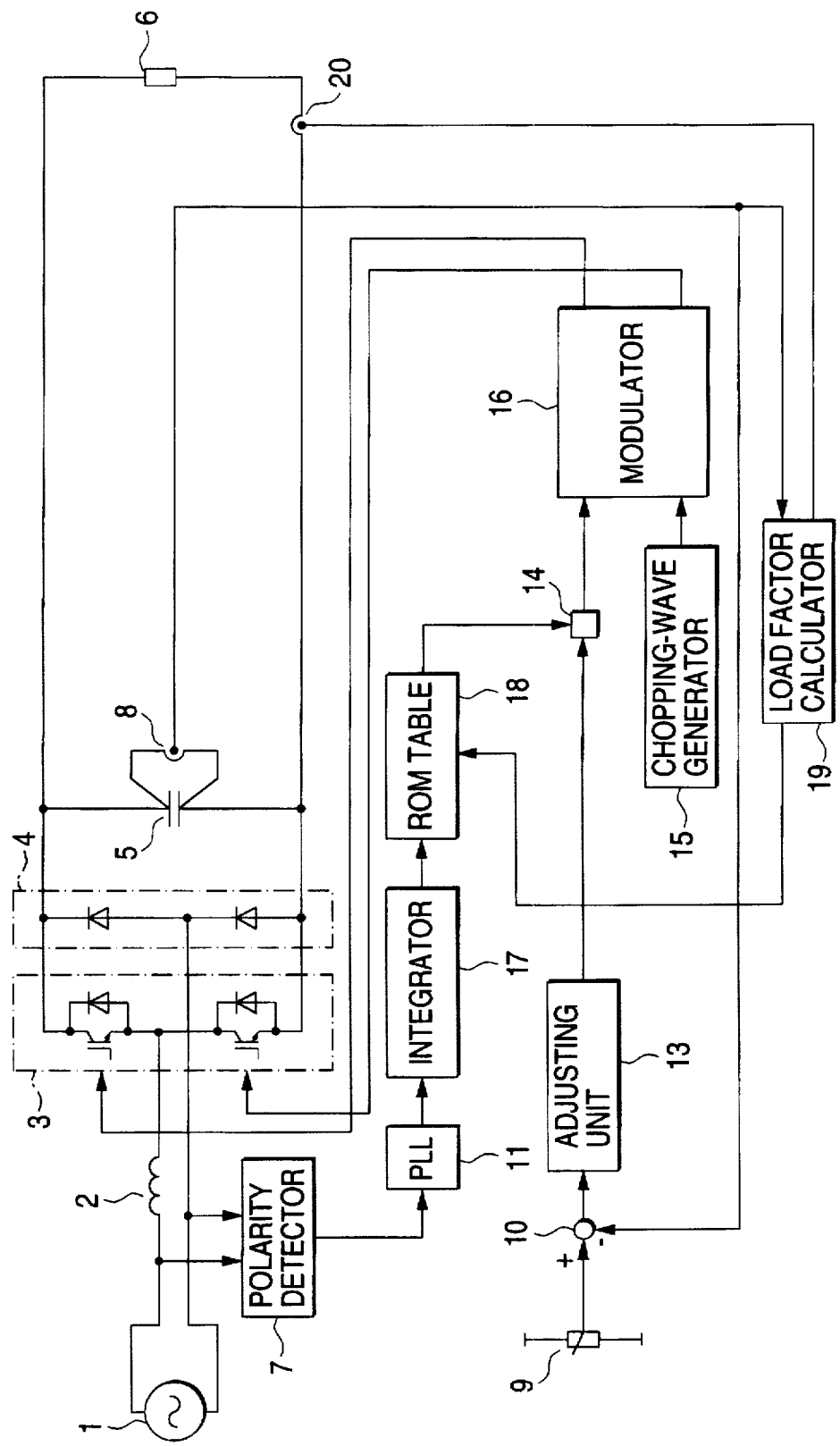
FIG. 5 is a circuit diagram showing an AC-DC converter according to a fourth embodiment of the invention.

FIG. 5 shows an AC-DC converter according to a fourth embodiment of the invention. The fourth embodiment is obtained by adding a load current detector 20 and the load factor calculator 19 to the third embodiment. A load current detection value, and a DC voltage detection value are applied to the load factor calculator 19 to obtain a load factor. The load factor thus obtained is applied to the ROM table 18.

In addition to a sine-wave, a wave such as a trapezoidal wave and a chopping wave is stored in the ROM table 18. A wave selected according to the load factor is multiplied by the output signal of the adjusting unit 13, to obtain a carrier wave.

The fourth embodiment is advantageous in the following points: For instance when the load changes abruptly, the control performance is improved by selecting a most suitable wave according to the load factor at that time instant, and similarly as in the above-described embodiment, the higher harmonics are reduced while the power factor is improved by making the AC input current wave more sinusoidal and by making it equal in phase to the voltage waveform.

Figure 6:
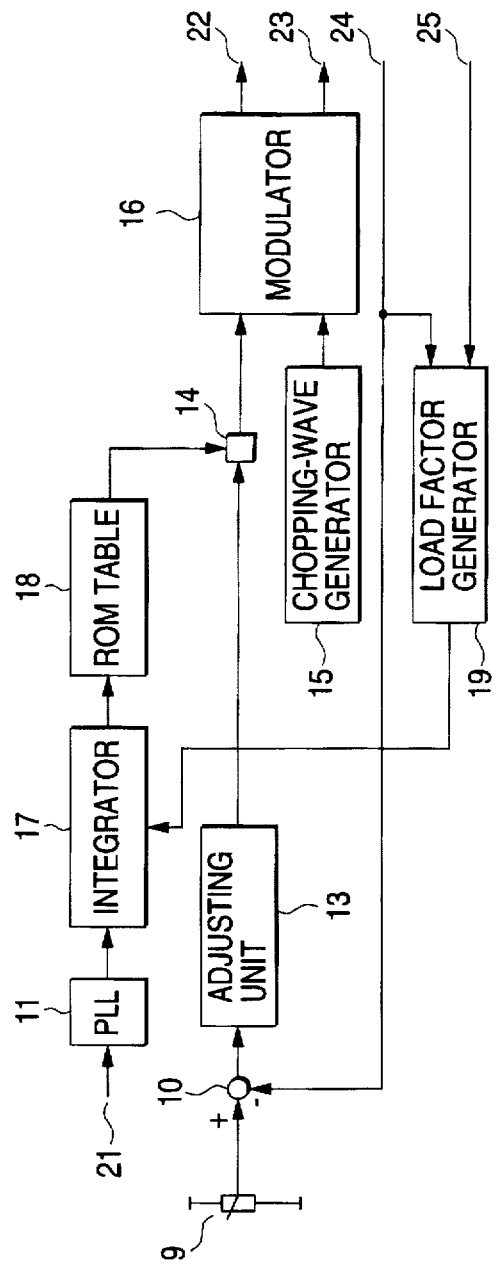
FIG. 6 is a block diagram showing an AC-DC converter according to a fifth embodiment of the invention.

FIG. 6 is a block diagram showing essential parts of an AC-DC converter according to a fifth embodiment of the invention.

In the fifth embodiment, unlike the fourth embodiment (FIG. 5) in which the waveform on which the carrier wave is based is changed according to the load factor, the waveform is left as it is, but the phase is changed.

In the circuit of FIG. 6, the output signal of the load factor calculator 19 is applied to the integrator 17. In FIG. 6, reference characters 21 designates an AC input voltage polarity detection value; 24, a DC voltage detection value; 25, a load current detection value; and 22 and 23, drives pulses applied to the switching element 3.

In the fifth embodiment, the phase of the output signal of the integrator 17 is shifted according to the load factor, and therefore the phase of the output wave of the ROM table 18 is shifted. Hence, for instance when the load changes abruptly, a wave most suitable in phase is selected, to improve the control performance. In addition, the higher harmonics of the AC input current waveform are reduced, and the power factor is improved.

Figure 7:
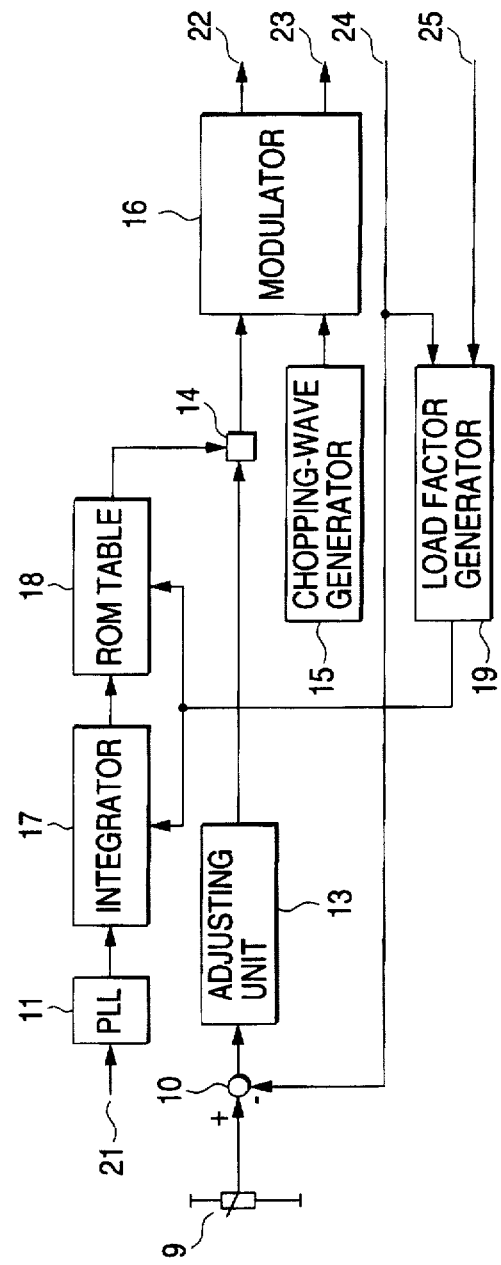
FIG. 7 is a block diagram showing an AC-DC converter according to a sixth embodiment of the invention.

FIG. 7 shows an AC-DC converter according to a sixth embodiment of the invention.

The sixth embodiment is a combination of the fourth and fifth embodiments shown respectively in FIGS. 5 and 6. That is, in the sixth embodiment, both the waveform on which the carrier wave is based, and its phase are changed according to the load factor. The operation of the sixth embodiment is obvious from those of the fourth and fifth embodiments respectively shown in FIGS. 5 and 6.

Figure 8:
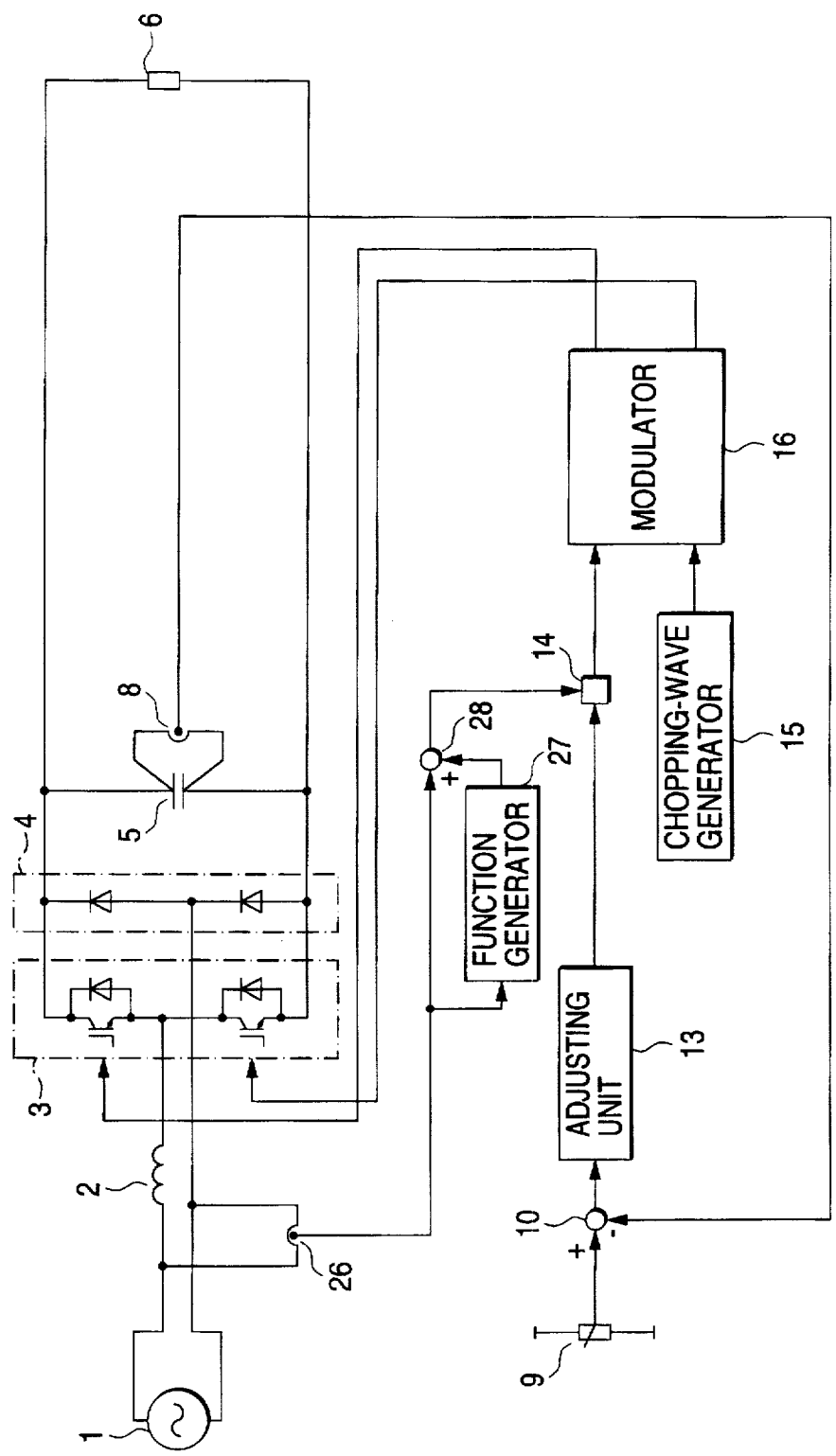
FIG. 8 is a circuit diagram showing an AC-DC converter according to a seventh embodiment of the invention.

FIG. 8 shows an AC-DC converter according to a seventh embodiment of the invention.

The seventh embodiment is obtained by adding a function generation 27 and an adder 28 to the AC-DC converter shown in FIG. 2. In the seventh embodiment, the waveform which the function generator outputs according to the AC voltage detection value is added to the AC voltage detection value, and the resultant waveform is multiplied by the output signal of the adjusting unit 13, to obtain a carrier wave.

The waveform outputted by the function generator is such that the frequency is an integer multiple of the frequency of the AC input voltage, and the one-period integration value is zero. This waveform is superposed on the AC input voltage detection value.

In this connection, the output waveform of the function generator is determined as follows: A distorted waveform which is newly formed by superposing the output waveform on the AC input voltage detection value makes the AC input current more sinusoidal, thus being effective in reducing the higher harmonics.

With the seventh embodiment, too, the higher harmonics is reduced, and the power factor is improved.

Figure 9:
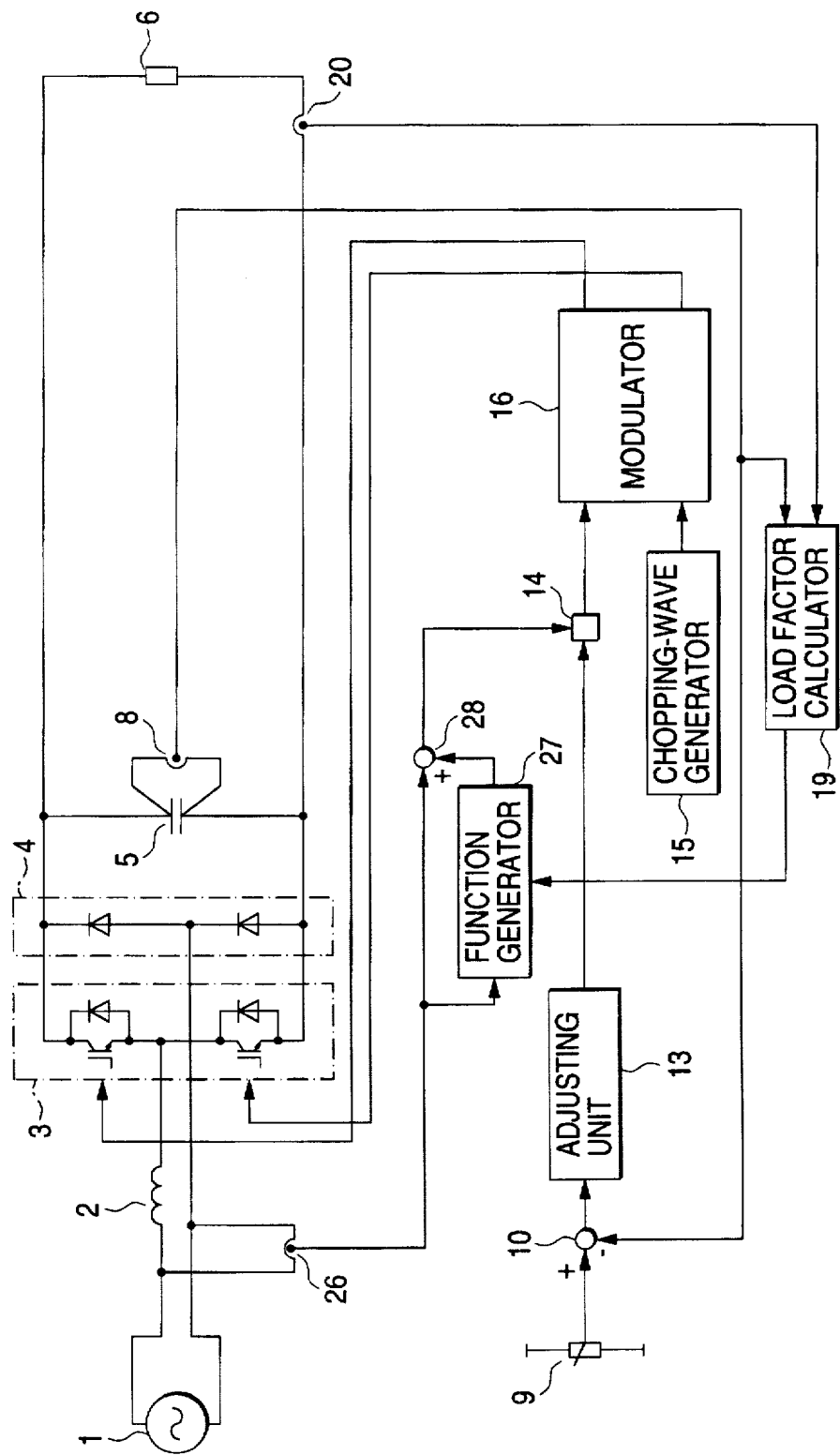
FIG. 9 is a circuit diagram showing an AC-DC converter according to an eighth embodiment of the invention.

FIG. 9 shows an AC-DC converter according to an eighth embodiment of the invention.

The eighth embodiment is obtained by adding a load current detector 20 and a load factor calculator 19 to the AC-DC converter shown in FIG. 8. In the eight embodiment, a signal according to the load factor is applied to the function generator 27.

In the eighth embodiment, the waveform superposed on the AC input voltage detection value and/or the phase thereof is changed according to the load factor, whereby the control to be made when the load changes abruptly is enhanced, and the higher harmonics are reduced, and the power factor is improved.

As was described above, with the AC-DC converter, the AC input voltage, the polarity of the latter, the DC output voltage, and the load current are detected as the need arises, to control the switching element of the main circuit, whereby, while the higher harmonics of the AC input current are reduced, and the power factor is improved, and the predetermined DC voltage is obtained.

That is, in the AC-DC converter of the invention, it is unnecessary to detect the AC input current with the AC current detector, which makes it possible to miniaturize the AC-DC converter as a whole, and to reduce the manufacturing cost of the latter, and to simplify the arrangement of the control circuit.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An AC-DC converter, comprising:
   DC output voltage instruction setting means for setting a DC output voltage instruction value;
   DC output voltage detecting means for detecting a DC output voltage detection value;
   adjusting means for adjusting which operates to zero a difference between the DC output voltage instruction value and the DC output voltage detection value to zero;
   means for generating a modulating wave;
   a modulator for comparing a carrier wave based on an output signal from said adjusting means with the modulating wave to output drive pulses;
   a switching element which turns on and off according to the drive pulses to provide a DC output voltage higher than a full-wave rectification voltage of an AC input voltage;
   an AC power source for generating an AC input voltage;
   means for detecting the polarity of the AC input voltage;
   means for generating a sine wave synchronous with the AC input voltage according to a detection value from said polarity detecting means; and
   a multiplier for multiplying the sine wave by an output signal of said adjusting means to obtain the carrier wave.

2. An AC-DC converter, comprising:
   DC output voltage instruction setting means for setting a DC output voltage instruction value;
   DC output voltage detecting means for detecting a DC output voltage detection value;
   adjusting means for adjusting which operates to zero a difference between the DC output voltage instruction value and the DC output voltage detection value to zero;
   means for generating a modulating wave;
   a modulator for comparing a carrier wave based on an output signal from said adjusting means with the modulating wave to output drive pulses;
   a switching element which turns on and off according to the drive pulses to provide a DC output voltage higher than a full-wave rectification voltage of an AC input voltage;

an AC power source for generating an AC input voltage;

means for detecting an AC input voltage to output an AC input voltage detection value; and a multiplier for multiplying the AC input voltage detection value by an output signal from the adjusting means to obtain the carrier wave.

3. An AC-DC converter as claimed in claim 1, wherein DC output voltage instruction setting means for setting a DC output voltage instruction value;

DC output voltage detecting means for detecting a DC output voltage detection value;

adjusting means for adjusting which operates to zero a difference between the DC output voltage instruction value and the DC output voltage detection value to zero;

means for generating a modulating wave;

a modulator for comparing a carrier wave based on an output signal from said adjusting means with the modulating wave to output drive pulses;

a switching element which turns on and off according to the drive pulses to provide a DC output voltage higher than a full-wave rectification voltage of an AC input voltage;

an AC power source for generating an AC input voltage;

means for detecting the polarity of an AC input voltage to output an AC input voltage polarity detection value;

means for generating a waveform which is synchronous with the AC input voltage and is zero in one-period integration value according to the AC input voltage polarity detection value; and a multiplier for multiplying the waveform by an output signal from the adjusting means to obtain the carrier wave.

4. An AC-DC converter as claimed in claim 3, wherein the waveform is changed in configuration and/or phase according to a load factor.

5. An AC-DC converter, comprising:

DC output voltage instruction setting means for setting a DC output voltage instruction value;

DC output voltage detecting means for detecting a DC output voltage detection value;

adjusting means for adjusting which operates to zero a difference between the DC output voltage instruction value and the DC output voltage detection value to zero;

means for generating a modulating wave;

a modulator for comparing a carrier wave based on an output signal from said adjusting means with the modulating wave to output drive pulses;

a switching element which turns on and off according to the drive pulses to provide a DC output voltage higher than a full-wave rectification voltage of an AC input voltage;

an AC power source for generating an AC input voltage;

means for detecting an AC input voltage to output an AC input voltage detection value;

a function generator for outputting a waveform which is synchronous with the AC input voltage and has a frequency which is an integer multiple of the frequency of the AC input voltage and which is zero in one-period integration value; and an adder for adding an output waveform from said function generator to the AC input voltage detection value to obtain the carrier wave.

6. An AC-DC converter as claimed in claim 5, wherein an output waveform of said function generator is changed in configuration or phase according to a load factor.

* * * * *